(12) United States Patent
Li et al.

(10) Patent No.: US 12,486,242 B2
(45) Date of Patent: Dec. 2, 2025

(54) LONG-ACTING LOW-ADDICTION HNK DERIVATIVE AND PREPARATION METHOD THEREFOR

(71) Applicant: SHENZHEN RUIJIAN BIOTECHNOLOGY CO., LTD, Guangdong (CN)

(72) Inventors: Shu Peng Li, Oakville (CA); Qiang Zhou, San Francisco, CA (US)

(73) Assignee: SHENZHEN RUIJIAN BIOTECHNOLOGY CO., LTD., Guangdong (CN)

( * ) Notice: Subject to any disclaimer, the term of this patent is extended or adjusted under 35 U.S.C. 154(b) by 386 days.

(21) Appl. No.: 17/918,671

(22) PCT Filed: Aug. 31, 2020

(86) PCT No.: PCT/CN2020/112373
§ 371 (c)(1),
(2) Date: Oct. 13, 2022

(87) PCT Pub. No.: WO2022/041174
PCT Pub. Date: Mar. 3, 2022

(65) Prior Publication Data
US 2023/0312500 A1  Oct. 5, 2023

(51) Int. Cl.
*C07D 307/68* (2006.01)
*A61P 25/24* (2006.01)

(52) U.S. Cl.
CPC ............ *C07D 307/68* (2013.01); *A61P 25/24* (2018.01)

(58) Field of Classification Search
CPC ... C07D 307/68; C07D 295/155; A61P 25/24; A61P 25/16; A61P 11/00; A61P 21/00; A61P 23/00; A61P 25/22; A61P 25/28; A61P 29/00; A61P 25/00; Y02P 20/55; A61K 31/341
USPC ....................................................... 514/461
See application file for complete search history.

(56) References Cited

U.S. PATENT DOCUMENTS

| | | | | |
|---|---|---|---|---|
| 9,650,352 | B2 * | 5/2017 | Wainer ................ | C07D 295/112 |
| 9,867,830 | B2 | 1/2018 | Wainer | |
| 9,963,435 | B2 | 5/2018 | Gomez | |
| 10,738,018 | B2 | 8/2020 | Gomez | |
| 10,919,842 | B2 | 2/2021 | Thomas | |
| 2014/0296241 | A1 | 10/2014 | Wainer et al. | |
| 2017/0049780 | A1 | 2/2017 | Wainer et al. | |
| 2018/0057470 | A1 | 3/2018 | Gomez et al. | |
| 2018/0098993 | A1 | 4/2018 | Wainer et al. | |
| 2018/0251435 | A1 | 9/2018 | Gomez et al. | |
| 2019/0135732 | A1 | 5/2019 | Thomas et al. | |
| 2019/0240184 | A1 | 8/2019 | Hashimoto | |
| 2020/0360393 | A1 | 11/2020 | Wainer et al. | |
| 2021/0139411 | A1 | 5/2021 | Thomas | |
| 2023/0192594 | A1 | 6/2023 | Thomas | |

FOREIGN PATENT DOCUMENTS

| | | |
|---|---|---|
| CN | 104395283 A | 3/2015 |
| CN | 109311801 A | 2/2019 |
| CN | 109475514 A | 3/2019 |
| CN | 110167541 A | 8/2019 |
| CN | 110218157 A | 9/2019 |
| CN | 110559282 A | 12/2019 |
| JP | 2015501302 A | 1/2015 |
| JP | 2019510768 A | 4/2019 |
| WO | 2013056229 A1 | 4/2013 |
| WO | 2017165878 A1 | 9/2017 |
| WO | 2018079693 A1 | 5/2018 |
| WO | 2019169165 A1 | 9/2019 |
| WO | 2022041172 A1 | 3/2022 |

OTHER PUBLICATIONS

International Search Report in the international application No. PCT/CN2020/112360, mailed on Jun. 16, 2021, 3 pages.
English translation of the Written Opinion of the International Search Authority in the international application No. PCT/CN2020/112360, mailed on Jun. 16, 2021, 3 pages.
C. G. Wermuth, "The Practice of Medicinal Chemistry", Telecommunication company, Aug. 15, 1998, p. 235-271, Chapter XIII, 39 pages.
Nozaki masakatsu, et al.,"The Practice of Medicinal Chemistry", Chemical company, 1st edition, Jul. 1, 1995, p. 98-99.
International Search Report in the international application No. PCT/CN2020/112363, mailed on Jun. 2, 2021, 3 pages.
English translation of the Written Opinion of the International Search Authority in the international application No. PCT/CN2020/112363, mailed on Jun. 2, 2021, 3 pages.
Supplementary European Search Report in the European application No. 20950843.1, mailed on Aug. 14, 2023, 7 pages.
English translation of the Written Opinion of the International Search Authority in the international application No. PCT/CN2020/112376, mailed on Jun. 2, 2021, 3 pages.
English translation of the Written Opinion of the International Search Authority in the international application No. PCT/CN2020/112373, mailed on Jun. 8, 2021, 10 pages.

(Continued)

*Primary Examiner* — Yevgeny Valenrod
(74) *Attorney, Agent, or Firm* — Cooper Legal Group, LLC

(57) ABSTRACT

The present application relates to a compound having the functions of being an antidepressant, improving anxiety and post-traumatic stress syndrome, anesthetizing, easing pain, improving cognitive function, protecting the lungs, preventing or treating amyotrophic lateral sclerosis or preventing or treating complex regional pain syndrome. Compared with existing known HNK compounds, the compound of the present invention has a longer drug efficacy period, and the compound of the present invention essentially does not lead to addiction.

14 Claims, 8 Drawing Sheets

(56) References Cited

OTHER PUBLICATIONS

International Search Report in the international application No. PCT/CN2020/112373, mailed on Jun. 8, 2021.
International Search Report in the international application No. PCT/CN2020/112376, mailed on Jun. 2, 2021.
Patrick J. Morris et al. "Synthesis and N-Methyl-D-aspartate (NMDA) Receptor Activity of Ketamine Metabolites" Letter, vol. 19, Aug. 22, 2017 (Aug. 22, 2017).

* cited by examiner

LONG-ACTING LOW-ADDICTION HNK DERIVATIVE AND PREPARATION METHOD THEREFOR

CROSS-REFERENCE TO RELATED APPLICATION

The application is the U.S.A. national phase entry of International Application No. PCT/CN2020/112373, filed on Aug. 31, 2020 and entitled "LONG-ACTING LOW-ADDICTION HNK DERIVATIVE AND PREPARATION METHOD THEREFOR", the disclosure of which is hereby incorporated by reference in its entirety.

TECHNICAL FIELD

The disclosure relates to the field of pharmaceuticals, in particular to a long-acting low-addiction HNK derivative for treating depression, including complex regional pain syndrome (CRPS) and a preparation method therefor.

BACKGROUND

Ketamine is a representative of phencyclidine-based intravenous anesthetics commonly used clinically, and is one of anesthetics that have developed rapidly clinically and in basic research in recent years. In clinical practice, it is often used to meet the anesthesia needs of pediatrics, obstetrics, perioperative period and patients with special diseases, because of its rapid induction, short action time, quick recovery, and less impact on the respiratory and circulatory systems.

Ketamine was first synthesized in 1962, used in human body in 1965, and officially approved by FDA for clinical use in 1970. The typical "dissociative anesthesia" and short-acting precise analgesia made it very popular, but it was found subsequently having psychiatric side effects. With the rapid development of other intravenous anesthetics, clinical use of ketamine had been greatly reduced. In the past 10 years, with the research on the usage and dosage of ketamine and the discovery of its effects of anti-inflammatory, anti-depressant, neuroprotective, analgesic and so on, the medical community's interest in ketamine has revived.

Ketamine has the functions of strong analgesia, forgetting, retaining spontaneous breathing and airway protective reflex, and maintaining hemodynamic stability, which makes ketamine play an important role in pre-hospital anesthesia and analgesia all along. Ketamine has both neurotoxic and neuroprotective effects.

Ketamine has an effect on postoperative cognitive function. Some researchers tested 50 children who received ketamine anesthesia and found that ketamine general anesthesia could reduce the cognitive function of the children 6 hours after operations, but had no effect on the cognitive function 24 hours after the operations. Hudetz et al. found that administration of 0.5 mg/kg ketamine during induction of general anesthesia could reduce the incidence of postoperative cognitive impairment one week after cardiac surgery. In recent years, numerous clinical trials have confirmed that administration of a single small dose of ketamine during surgery can reduce the incidence of postoperative cognitive impairment.

Ketamine has analgesic effect. Sub-anesthetic doses of ketamine are often used for anti-hyperalgesia and the treatment of acute and chronic pain. It has been proved by research that gargling with ketamine-saline mixture before anesthesia induction can significantly reduce the incidence and severity of postoperative sore throat caused by tracheal intubation under general anesthesia. Use of opioids during surgery increases the dose of opioids used for postoperative analgesia, which is called opioid tolerance. It is clinically found that the use of ketamine can prevent opioid tolerance, reverse morphine tolerance, and enhance the analgesic effect of morphine. Some studies have confirmed that intraoperative use of small dose ketamine can prevent postoperative hyperalgesia induced by remifentanil. Cagla et al. found that in the case that 0.15 mg/kg of ketamine was administered intravenously to patients after undergoing knee arthroscopy, postoperative analgesia satisfaction was significantly improved, and the sedation score was lower than that of the group administrated with ketamine combined with midazolam.

Ketamine has a lung protective effect. In recent years, ketamine has been found to have a significant lung protective effect. Clinical trials have confirmed that administration by intravenous or nebulization before one-lung ventilation in thoracic surgery can reduce levels of inflammatory factors in blood, in which nebulization inhalation is more beneficial to cardiovascular system and airway pressure, and the effect of nebulization at the pulmonary ventilation lung is better than at two lungs. Ketamine is also commonly used clinically in a rescue of fatal asthma attacks when conventional treatment fails, and its use is recognized to improve prognosis.

Ketamine has an antidepressant effect. In 2000, Berman et al. reported for the first time that scores of Hamilton Depression Scale decreased by 50% or more in more than 50% patients within 72 hours after a single intravenous injection of sub-anesthetic dose of ketamine (0.5 mg/kg). In recent years, more animal and clinical studies have further confirmed the antidepressant effect of ketamine. Ketamine is also used as anesthesia for electroconvulsive therapy in depressed patients.

The patent application No.: CN 201280062294X, entitled "Use of (2R,6R)-hydroxynorketamine, (S)-dehydronorketamine and Other Stereoisomers of Dehydrogenation and Hydroxylation Metabolites of (R,S)-ketamine in treatment of depression and neuropathic pain", discloses that CNS (central nervous system) side effects are related to the activity of (R,S)-ketamine to NMDA receptors. Based on ketamine, (2R, 6R; 2S, 6S)-hydroxynorketamine (HNK) was studied and synthesized. The compound has no activity to NMDA receptor, thus avoiding possible side effects, and is said to have therapeutic efficacies for bipolar depression, major depressive disorder, Alzheimer's dementia, amyotrophic lateral sclerosis, complex regional pain syndrome (CRPS), chronic pain, or neuropathic pain.

In our experimental studies, it was found that (2R,6R; 2S,6S)-hydroxynorketamine (HNK) did not have a long efficacy after administration, and basically lost activity within one week, which seriously limits a desired long-term effect in the treatment of depression. At the same time, our studies also found that use of HNK would produce a certain degree of addiction, which caused adverse effects on patients' body and mind. Therefore, how to modify the structure of (2R,6R;2S,6S)-hydroxynorketamine (HNK) to obtain a drug with longer efficacy and lower addiction is the problem to be solved to obtain a great therapeutic potential.

SUMMARY

The disclosure relates to a compound having an efficacy in anti-depression, anesthesia, alleviating pain, improving cognitive function, lung protection, preventing or treating amyotrophic lateral sclerosis or preventing or treating complex regional pain syndrome.

Compared with the existing known HNK compounds, the compound of the disclosure has a longer efficacy duration, which is specifically manifested in that the known HNKs are metabolized within one week and have no activity, while the efficacy of the compound of the disclosure can last for more than one week, specifically for more than 7 days, more than 10 days, more than 14 days and the like. Moreover, the compound of the disclosure is substantially non-addictive and are 2 times, 5 times, 10 times, or 20 times less addictive than the known HNK compounds.

The disclosure provides a compound represented by Formula I:

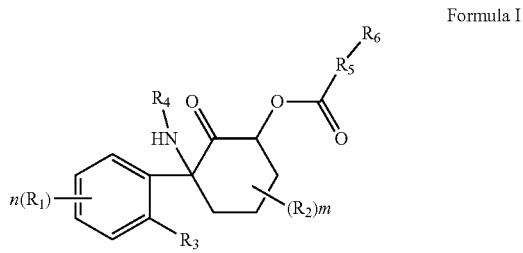

Formula I in which m is an integer from 0 to 3, and n is an integer from 0 to 4; $R_1$ and $R_2$ are each independently one or more selected from a group consisting of H, halogen, hydroxyl, amino, cyano, substituted or unsubstituted $C_1$-$C_6$ alkyl group, substituted or unsubstituted $C_2$-$C_6$ alkenyl group, substituted or unsubstituted $C_2$-$C_6$ alkynyl group, substituted or unsubstituted $C_3$-$C_{10}$ cycloalkyl group, substituted or unsubstituted $C_2$-$C_{10}$ heterocyclic group, substituted or unsubstituted $C_1$-$C_6$ alkoxy group, substituted or unsubstituted mono- and di- $C_1$-$C_6$ alkylamino group, substituted or unsubstituted aryl group, and substituted or unsubstituted heteroaryl group; $R_3$ is halogen; $R_4$ is selected from a group consisting of H, substituted or unsubstituted $C_1$-$C_6$ alkyl group, substituted or unsubstituted $C_1$-$C_8$ acyl group, substituted or unsubstituted aryl acyl group, and substituted or unsubstituted heteroarylacyl group; $R_5$ is selected from a group consisting of substituted or unsubstituted $C_3$-$C_{10}$ cycloalkyl group, substituted or unsubstituted $C_2$-$C_{10}$ heterocyclic group, substituted or unsubstituted aryl group, and substituted or unsubstituted heteroaryl group; $R_6$ is selected from a group consisting of H, substituted or unsubstituted $C_1$-$C_6$ alkyl group, substituted or unsubstituted $C_2$-$C_6$ alkenyl group, substituted or unsubstituted $C_2$-$C_6$ alkynyl group, substituted or unsubstituted $C_3$-$C_{10}$ cycloalkyl group, substituted or unsubstituted $C_2$-$C_{10}$ heterocyclic group, substituted or unsubstituted aryl group, substituted or unsubstituted heteroaryl group, substituted or unsubstituted $C_1$-$C_8$ acyl group, substituted or unsubstituted aryl acyl group, and substituted or unsubstituted heteroaryl acyl group, or a salt, stereoisomer or tautomer of the compound.

A group is substituted mentioned above means that the group is substituted by a substituent selected from OH; $NH_2$; $C_1$-$C_{10}$ alkyl, alkenyl or alkynyl group; $C_1$-$C_{10}$ alkylamine group; sulfhydryl group; $C_1$-$C_{10}$ alkyl-sulfhydryl group; $C_1$-$C_{20}$ alkoxy group; $C_1$-$C_{10}$ carbonyl group; $C_3$-$C_{10}$ cycloalkyl group; 3 to 10-membered heterocyclic group with one or more heteroatoms selected from N, S, O and P; $C_6$-$C_{20}$ aryl; $C_2$-$C_{20}$ heteroaryl group; nitrocyano; and halogen.

Preferably, the above-mentioned compound is represented by Formula II:

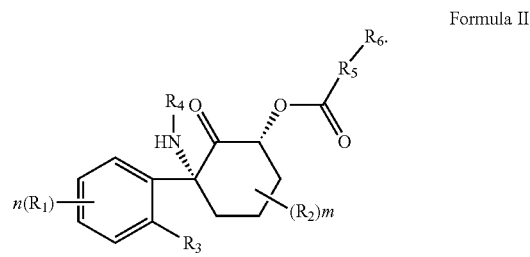

Formula II

Preferably, the above-mentioned compound is represented by Formula III:

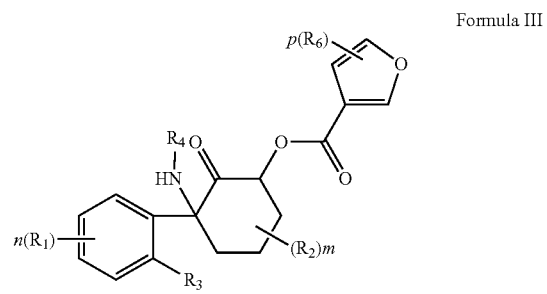

Formula III in which p is an integer from 0 to 3.

Preferably, the above-mentioned compound is represented by Formula IV:

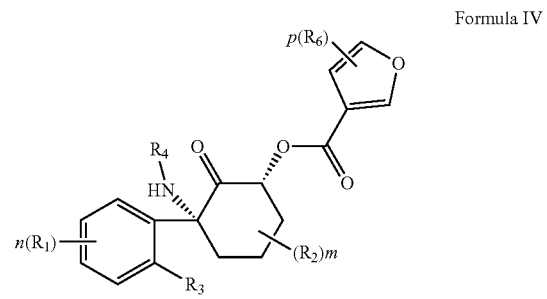

Formula IV in which p is an integer from 0 to 3.

Preferably, the above-mentioned compound is the following compound:

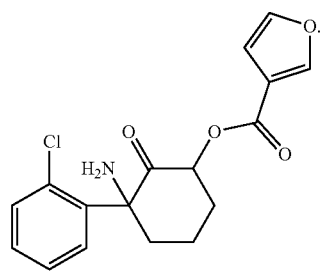 [SMILES: NC1(c2ccccc2Cl)CCCC(OC(=O)c2ccoc2)C1=O]

Preferably, the above-mentioned compound is the following compound:

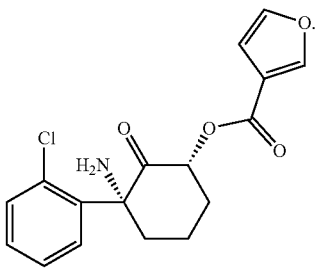 [SMILES: N[C@@]1(c2ccccc2Cl)CCC[C@@H](OC(=O)c2ccoc2)C1=O]

The disclosure also provides a compound as follows:

Formula V

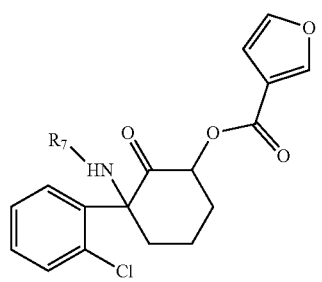

in which $R_7$ is H or a protecting group, or a salt, stereoisomer or tautomer thereof.

Preferably, the above-mentioned compound has the following structure:

Formula VI

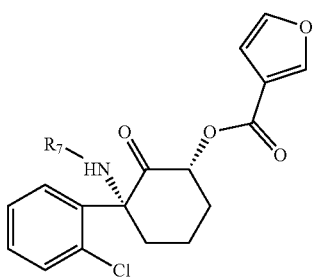

or a salt, stereoisomer or tautomer thereof.

Preferably, the above-mentioned compound has the following structure:

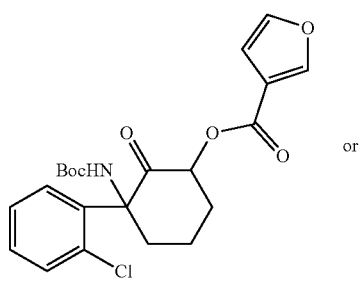

or

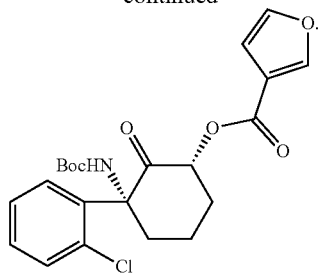

or a salt, stereoisomer or tautomer thereof.

The disclosure also provides a pharmaceutical composition including the compound, or a salt, stereoisomer or tautomer thereof of any one of claims 1-8, and optionally a pharmaceutically acceptable carrier.

The disclosure also provides a preparation method of a compound including preparation steps below:

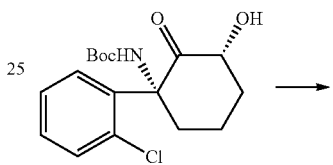

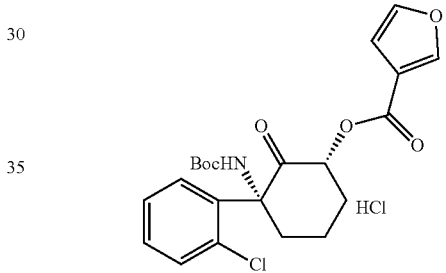

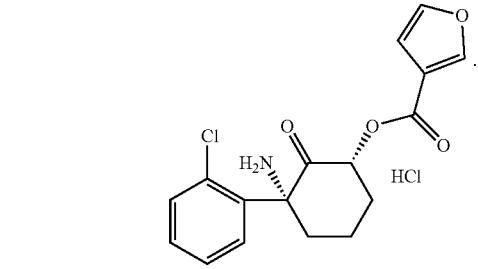

Use of any of the above compounds in preparation of a medicament for anesthesia, alleviating pain, improving cognitive function, lung protection, anti-depression, mitigating anxiety and post-traumatic stress syndrome, and treating amyotrophic lateral sclerosis and complex regional pain syndrome.

The pain includes: chronic pain or neuropathic pain. The depression includes: bipolar depression, major depressive disorder. The anxiety and post-traumatic stress syndrome are mitigated. The improvement of cognitive function includes prevention or treatment of Alzheimer's dementia, Parkinson's disease and so on.

With respect to all of the above diseases, the use also covers preventive or therapeutic effects.

Stereoisomers of all the above compounds include enantiomers and diastereomers.

The disclosure is not limited to any particular tautomer, but includes all tautomer forms in the case that all of the above compounds are present in different tautomer forms.

All compounds described above include compounds having all possible isotopes of the atoms present in the compounds. Isotopes include those atoms with the same atomic number but different mass numbers. Generally, for example, without limitation, isotopes of hydrogen include tritium and deuterium, and isotopes of carbon include $^{11}C$, $^{13}C$ and $^{14}C$.

The disclosure also provides a pharmaceutical composition, and the compound disclosed herein may be administered as a pure chemical, but is preferably administered as a pharmaceutical composition. Accordingly, the disclosure provides a pharmaceutical composition comprising a compound or a pharmaceutically acceptable salt and at least one pharmaceutically acceptable carrier. The pharmaceutical composition may contain the compound or a salt thereof as the only active agent, but preferably contains at least another active agent. In some embodiments, the pharmaceutical composition is an oral dosage form which contains about 0.1 mg to about 1000 mg, about 1 mg to about 500 mg, about 10 mg to about 200 mg of a compound of Formula I and optionally about 0.1 mg to about 2000 mg, about 10 mg to about 1000 mg, about 100 mg to about 800 mg, or about 200 mg to about 600 mg of other active agent(s) in a unit dosage form.

The compounds disclosed herein may be administered orally, topically, parenterally, by inhalation or spray, sublingually, transdermally, by oral administration, rectally, as an ophthalmic solution, or by other means in a dose unit formulation comprising a conventional pharmaceutical carrier. The pharmaceutical composition can be formulated into any medicinal forms, such as aerosol, cream, gel, pill, capsule, tablet, syrup, transdermal patch, or ophthalmic solution. Some dosage forms, such as tablet and capsule, may be subdivided into appropriate dosage unit forms containing appropriate amount of an active component, such as an effective amount, to achieve the desired purpose.

The carriers include excipients and diluents, and must be of sufficiently high purity and sufficiently low toxicity to be suitable for administration to a patient to be treated. The carrier may be inert or it may itself have medicinal benefits.

The carrier includes, but is not limited to, a binder, a buffer, a colorant, a diluent, a disintegrant, an emulsifier, a flavoring agent, a glidant, a lubricant, a preservative, a stabilizer, a surfactant, a tableting agent or a wetting agent. Some carriers may belong to more than one categories, e.g. a vegetable oil may be used as a lubricant in some formulations or as a diluent in others. Exemplary pharmaceutical carriers include sugar, starch, cellulose, powdered tragacanth, malt, gelatin, talc and vegetable oils. An optional active agent may be included in the pharmaceutical composition, and does not substantially affect the activity of the compound of the disclosure.

The compound or a salt thereof of the disclosure may be the only active agent to be administered or may be administered in combination with other active agents. For example, the compound of the disclosure may be administered in combination with another active agent selected from any of the following.

Antidepressant: escitalopram oxalate, fluoxetine, paroxetine, duloxetine, sertraline, citalopram, bupropion, venlafaxine, duloxetine, naltrexone, mirtazapine, venlafaxine, atomoxetine, bupropion, doxepin, amitriptyline, clomipramine, nortriptyline, buspirone, aripiprazole, clozapine, loxapine, olanzapine, quetiapine, risperidone, ziprasidone, carbamazepine, gabapentin, lamotrigine, phenytoin, pregabalin, donepezil, galanthamine, memantine, rivastigmine, tramiprosate, or their pharmaceutically active salts or prodrugs, or combinations thereof.

Medicines for schizophrenia: aripiprazole, lurasidone, asenapine, clozapine, ziprasidone, risperidone, quetiapine, trifluoperazine, olanzapine, loxapine, flupentioxol, perphenazine, haloperidol, chlorpromazine, flupenazine, fluphenazine and paliperidone.

Medicines for Alzheimer's dementia: donepezil, rivastigmine, galantamine, memantine.

Medicine for ALS: riluzole.

Medicines for pain: acetaminophen; aspirin; NSAIDS which include diclofenac, diflunisal, etodolac, fenoprofen, flurbiprofen, ibuprofen, indomethacin, ketoprofen, ketorolac, meclofenamic acid, mefenamic acid, meloxicam, nabumetone, naproxen, oxaprozin, phenylbutazone, piroxicam, sulindac, Tolmetinopiods; Cox-2 inhibitors such as celecoxib; and anesthetic analgesics such as buprenorphine, butorphanol, codeine, dihydrocodeinone, hydromorphone, levorphanol, pethidine, methadone, morphine, nalbuphine, oxycodone, oxymorphinone, pentazocine, propoxyphene; and central analgesics such as tramadol.

The foregoing list of other active agents is exemplary and not completely included. Other active agents not included in the above list may also be administered in combination with the compound of Formula I. Although in some embodiments, other active agents may be administered with a dose less than the generally prescribed and, in some cases, less than the approved minimum dose, other active agents may be administered in accordance with its approved prescribed information.

The disclosure includes a method for treating depressive disorders, particularly, bipolar depression and major depressive disorder, and particularly for treating treatment-resistant depression, in which the effective amount of the compound is a dose effectively to reduce depressive symptoms. The reduction of depressive symptoms means achieving a reduction of 50% or more of the symptoms identified on a depressive symptom rating scale, or a score on $HRSD_{17}$ of less than or equal to 7, or a score on $QID-SR_{16}$ of less than or equal to 5, or a score on MADRS of less than or equal to 10.

The disclosure provides an effective amount to reduce pain (or analgesia), in which the reduction of pain means achieving a reduction of 50% or greater of pain according to the pain rating scale.

TERMINOLOGY DEFINITIONS

"Stereoisomers" are compounds that have the same chemical composition but differ in the arrangements of atoms or groups in space.

"Diastereomers" are stereoisomers that have two or more chiral centers and are not mirror images of each other. Diastereomers have different physical properties, such as melting points, boiling points, spectral properties and reactivities. A mixture of diastereomers can be separated under high resolution analysis processes such as electrophoresis, crystallization, in the presence of resolving agents or with chromatography, for example, chiral HPLC columns.

"Enantiomers" refers to two stereoisomers of a compound that are non-superimposable mirror images of each other. A mixture of enantiomers with a ratio of 50:50 is referred to as a racemic mixture or a racemate, which may generate during a chemical reaction or a processing where stereoselectivity or stereospecificity is no longer present.

"Alkyl" includes a saturated aliphatic hydrocarbon group with a branched or straight chain and has a specified number of carbon atoms, typically from 1 to about 12 carbon atoms. The term $C_1$-$C_6$ alkyl group used in the text represents an alkyl group having 1 to about 6 carbon atoms. When $C_0$-$C_n$ alkyl used with another group in the text, taking (phenyl) $C_0$-$C_4$ alkyl as an example, the specified group, in this case, is phenyl group either directly bonded by a single covalent bond ($C_0$) or bonded by connected with an alkyl chain having a specified number of carbon atoms (in this case, 1 to about 4 carbon atoms). Examples of alkyl groups include, but are not limited to, methyl, ethyl, n-propyl, isopropyl, n-butyl, 3-methylbutyl, tert-butyl, n-pentyl and secondary pentyl.

"Alkenyl" refers to a straight or branched hydrocarbon chain that includes one or more unsaturated carbon-carbon bonds which may exist at any stable point along the chain. The alkenyl group described herein generally has 2 to about 12 carbon atoms. Preferably, the alkenyl group is a lower alkenyl group, which has 2 to about 8 carbon atoms, such as: $C_2$-$C_8$, $C_2$-$C_6$ or $C_2$-$C_4$ alkenyl group. Examples of an alkenyl group include vinyl, propenyl and butenyl.

"Alkoxy" refers to an alkyl group as defined above having a specified number of carbon atoms bonded by an oxygen bridge. Examples of an alkoxy group include, but are not limited to, methoxy, ethoxy, 3-hexyloxy, and 3-methylpentyloxy.

Halogens are well known in the art, preferably F, Cl, Br, I.

The term "heterocyclic ring" represents a 5- to 8-membered saturated ring, partially unsaturated ring, or aromatic ring containing 1 to about 4 heteroatoms selected from N, O and S with the remaining ring atoms being carbon; or a 7- to 11-membered saturated ring, partially unsaturated ring, or aromatic heterocyclic system; and a 10- to 15-membered tricyclic ring system containing at least one heteroatom selected from N, O, or S in the polycyclic ring system and up to about 4 heteroatoms independently selected from N, O and S are contained in each ring of the polycyclic ring system. Unless otherwise specified, the heterocyclic ring may be bonded to a group substituted at any heteroatom or any carbon atom and obtaining a stable structure. When indicated, the heterocyclic ring described herein may be substituted at a carbon or a nitrogen atom as long as the resulting compound is stable. Nitrogen atoms in the heterocyclic ring may optionally be quaternized. Preferably a total number of heteroatoms in the heterocyclic group is not greater than 4 and preferably a total number of S and O atoms in the heterocyclic group is not greater than 2, more preferably not greater than 1. Examples of a heterocyclic group include: pyridyl, indolyl, pyrimidinyl, pyridizinyl, pyrazinyl, imidazolyl, oxazol, furyl, phenylthio, thiazolyl, triazolyl, tetrazolyl, isoxazolyl, quinolyl, pyrrolyl, pyrazolyl, benzo[b]thiophenyl, isoquinolinyl, quinazolinyl, quinoxalinyl, thienyl, isoindolyl, dihydroisoindolyl, 5,6,7,8-tetrahydroisoquinoline, pyridyl, pyrimidinyl, furyl, thienyl, pyrrolyl, pyrazolyl, pyrrolidinyl, morpholinyl, piperazinyl, piperidinyl and pyrrolidinyl.

"Aryl or heteroaryl" represents a stable 5- or 6-membered monocyclic or polycyclic ring containing 1 to 4, or preferably 1 to 3 heteroatoms selected from N, O and S and the remaining ring atoms being carbon. When the total number of S and O atoms in the heteroaryl group exceeds 1, these heteroatoms are not adjacent to each other. Preferably, the total number of S and O atoms in a heteroaryl group is not greater than 2. It is especially preferred that the total number of S and O atoms in a heteroaryl group is not greater than one. Nitrogen atom in the heterocyclic ring may optionally be quaternized. When specified, these heteroaryl groups may also be substituted with carbon or non-carbon atom(s) or group(s). Such substitution may include fusing with a 5- to 7-membered saturated ring group optionally containing 1 or 2 heteroatoms independently selected from N, O, and S, so as to form, for example, [1,3] dioxazolo[4,5-c]pyridyl. Examples of a heteroaryl group include, but are not limited to: pyridyl, indolyl, pyrimidinyl, pyridizinyl, pyrazinyl, imidazolyl, oxazolyl, furyl, phenylthio, thiazolyl, triazolyl, tetrazolyl, isoxazolyl, quinolyl, pyrrolyl, pyrazolyl, benzo[b]thiophenyl, isoquinolinyl, quinazolinyl, quinoxalinyl, thienyl, isoindolyl or 5,6,7,8-tetrahydroisoquinoline. An aryl group is preferably phenyl, naphthyl, etc.

"Depressive disorder" includes low mood, decreased interest in activities, decreased mental activity or irritability, altered appetite, inattention or indecision, excessive guilt or low self-esteem; and suicide idea which may occur in the case of mood disorders due to depression, bipolar depression, other diseases or conditions, substance-induced mood disorders, or mood disorders due to other unknown etiologies. It can also co-exist with a variety of other mental disorders, including but not limited to mental disorders, cognitive disorders, eating disorders, anxiety disorders and personality disorders. The longitudinal course, history, type of symptoms, and etiology help to distinguish the various forms of mood disorders from one another.

"A salt of a compound" refers to a derivative of the disclosed compound in which the parent compound is modified by addition of a non-toxic acid or base to prepare the salt thereof, and also refers to a pharmaceutically accepted solvate, including hydrate, of the compound and the salt thereof. Examples of a pharmaceutically accepted salt include, but are not limited to, an inorganic or organic acid addition salt of a basic residue such as amine, an inorganic or organic base addition salt of an acidic residue such as carboxylic acid, and the like, or a combination of one or more of the above salts. The pharmaceutically accepted salts include nontoxic salts and quaternary ammonium salts formed from the parent compound and such as nontoxic inorganic or organic acids. For example, non-toxic acid salts include those derived from inorganic acids, such as hydrochloric, hydrobromic acid, sulfuric acid, sulfamic acid, phosphoric acid, nitric acid, etc. Other acceptable inorganic salts include metal salts such as sodium salt, potassium salt and cesium salt, etc., and alkaline earth metal salts such as calcium salt, magnesium salt, etc., and combinations of one or more of the above salts.

An organic salt of the compound includes a salt prepared from an organic acid such as acetic acid, trifluoroacetic acid, propionic acid, succinic acid, glycolic acid, stearic acid, lactic acid, malic acid, tartaric acid, citric acid, ascorbic acid, pamoic acid, maleic acid, hydroxymaleic acid, phenylacetic acid, glutamic acid, benzoic acid, salicylic acid, methanesulfonic acid, ethanesulfonic acid, benzenesulfonic acid, p-aminobenzenesulfonic acid, 2-acetylbenzene acid, fumaric acid, p-toluenesulfonic acid, methanesulfonic acid, ethanedisulfonic acid, oxalic acid, isethionic acid, HOOC—$(CH_2)_n$—COOH (in which n is 0 to 4); an organic amine salt, such as triethylamine salt, pyridine salt, methylpyridine salt, ethanolamine salt, triethanolamine salt, dicyclohexylamine salt, N,N'-dibenzyl ethylenediamine salt, etc.; and an amino acid salt, such as arginine, aspartate, glutamate, etc., and combinations of one or more of the above salts.

DETAILED DESCRIPTION

Example 1: Synthesis of (2R,6R)-6-Hydroxynorketamine (HNK)

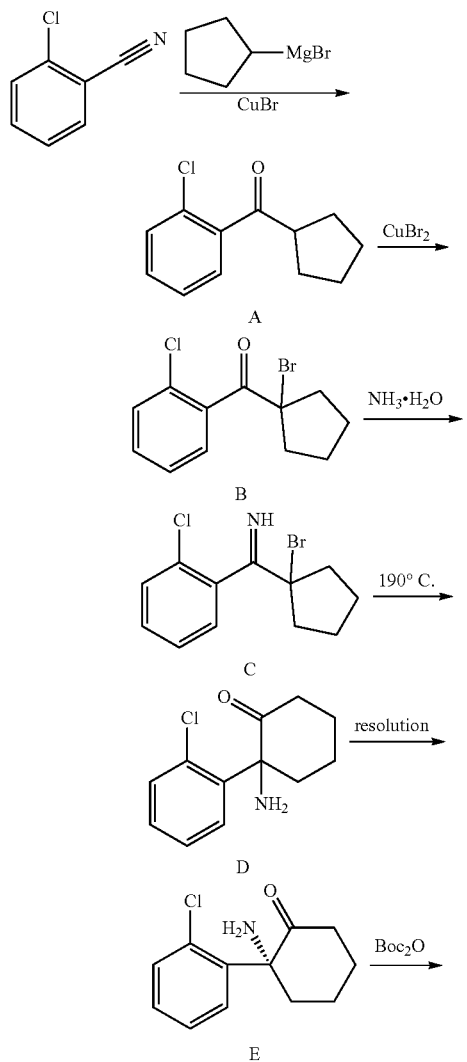

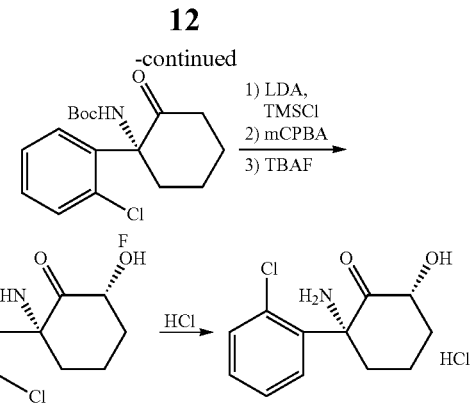

Figure 1:
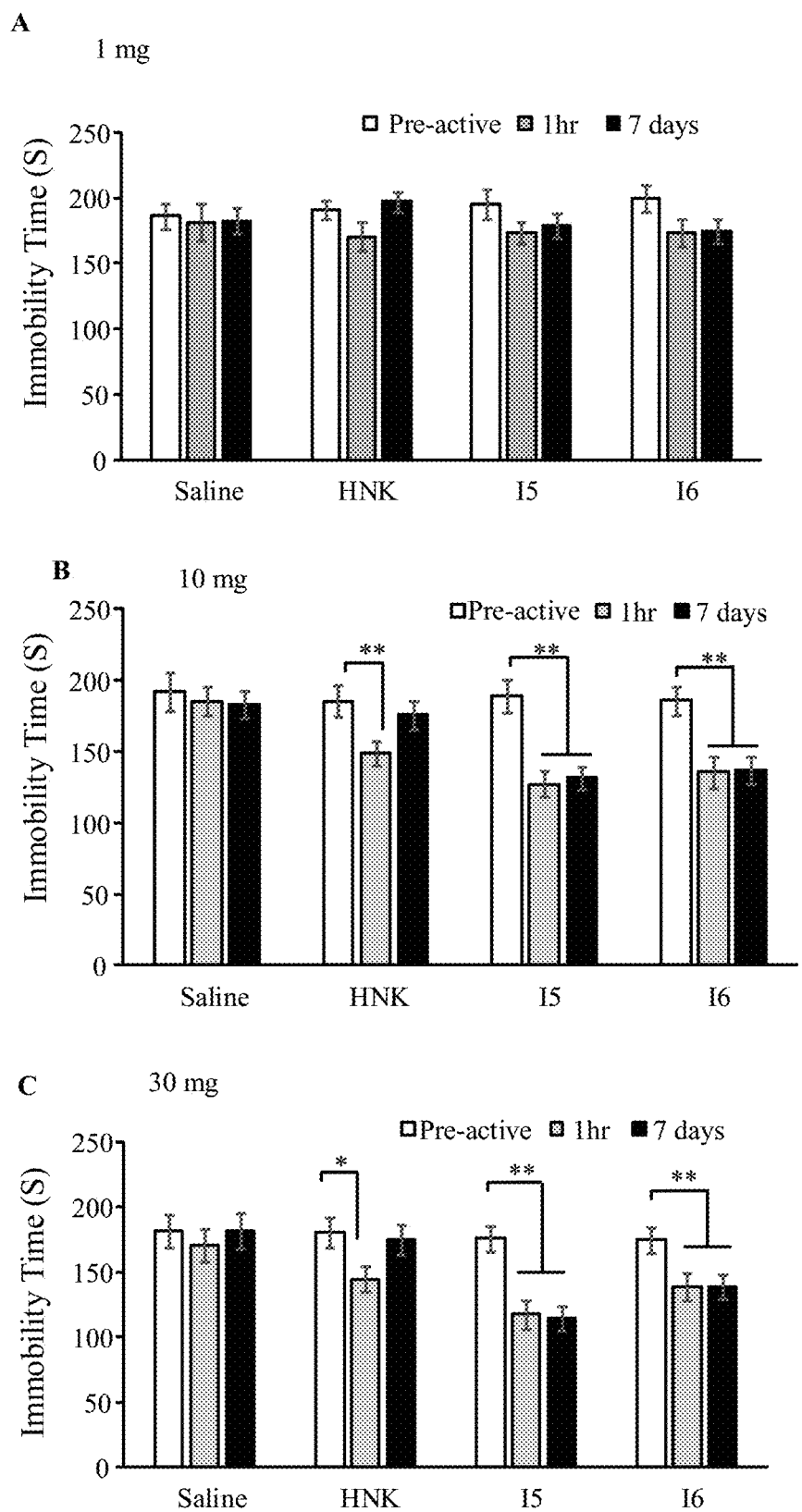
FIG. 1. shows the antidepressant effects of a drug with different doses within 7 days.
Figure 2:
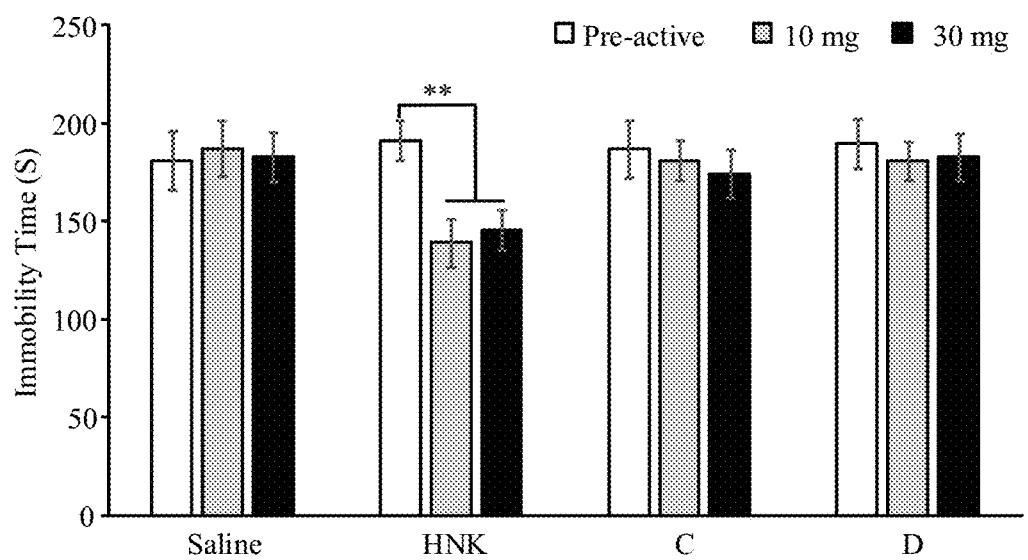
FIG. 2. shows the antidepressant effects of Compounds C and D.
Figure 3:
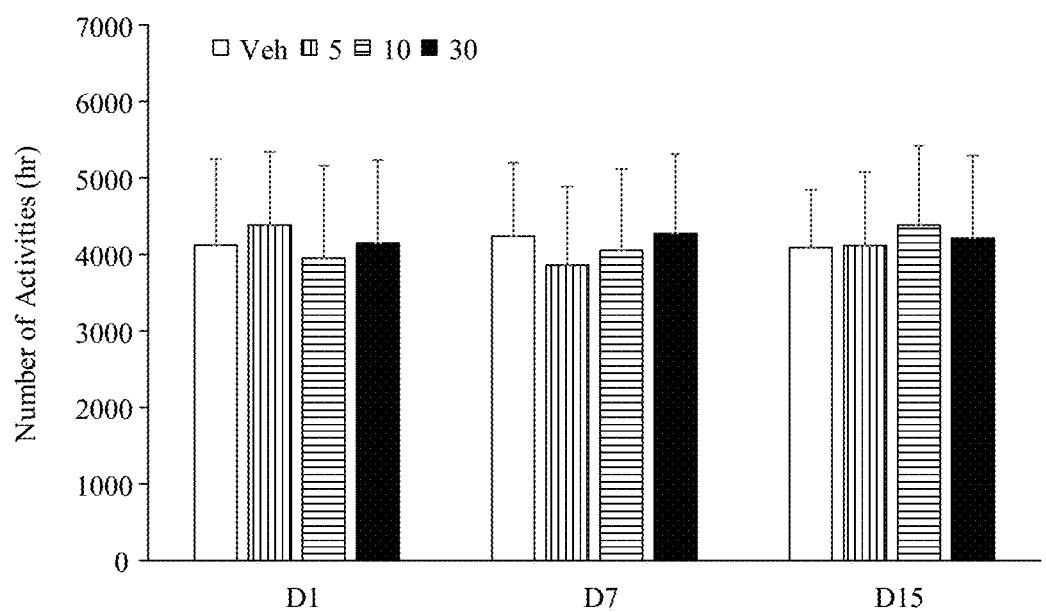
FIG. 3. shows the non-sensitization effect of Compound I6.
Figure 4:
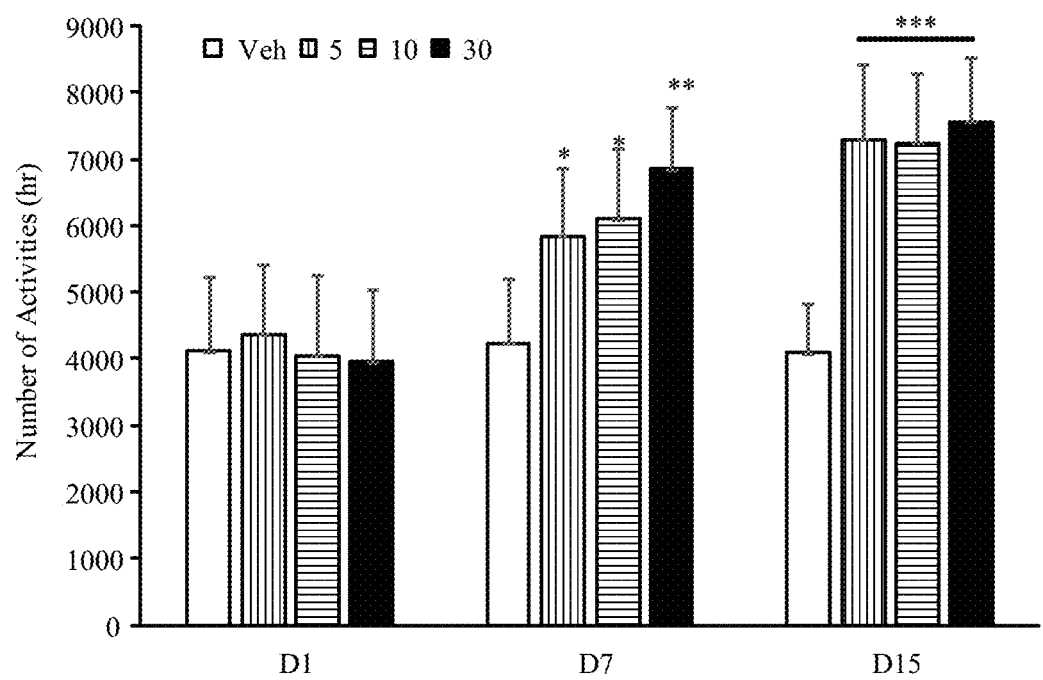
FIG. 4. shows the behavioral sensitization effect of Compound C.
Figure 5:
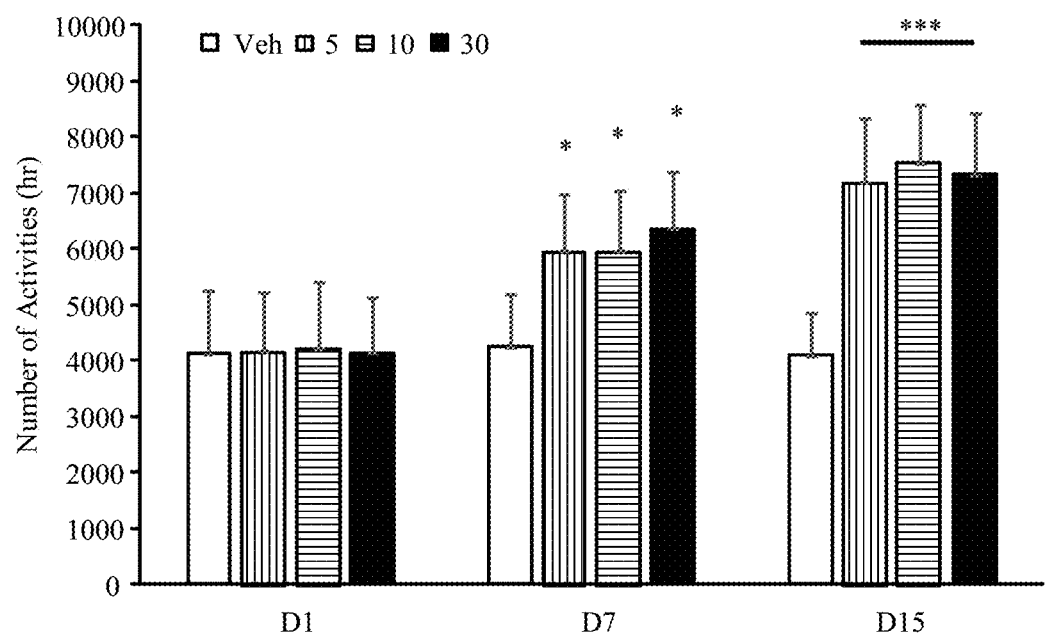
FIG. 5. shows the behavioral sensitization effect of Compound D.
Figure 6:
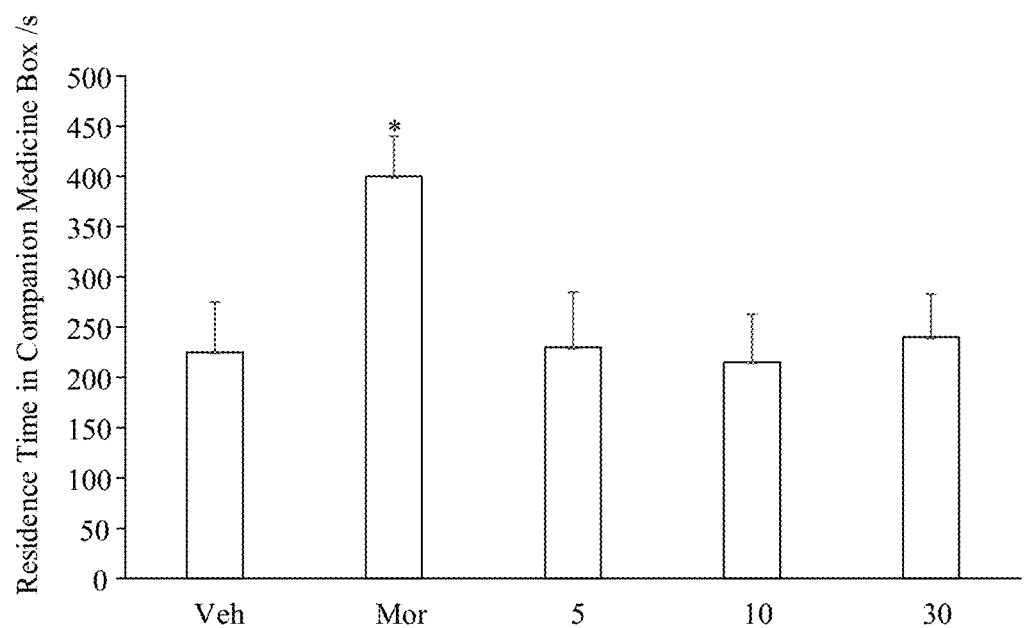
FIG. 6. shows the non-position preference effect of Compound I6 on mice.
Figure 7:
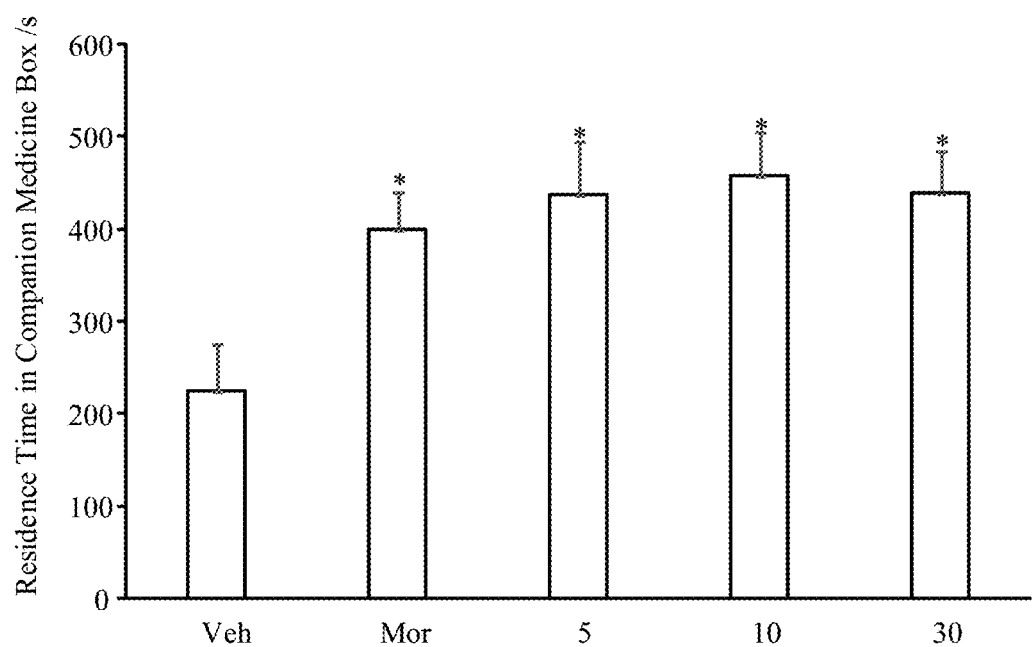
FIG. 7. shows the induced position preference of Compound 7.
Figure 8:
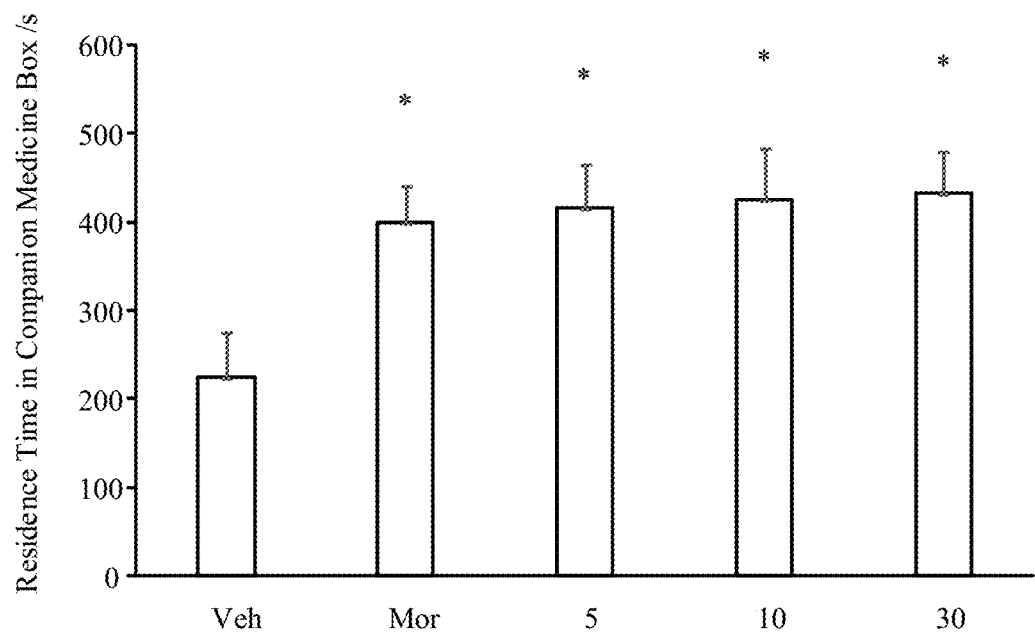
FIG. 8. shows the induced position preference of Compound D.

Step 1: To a two-neck flask or a three-neck flask, added were 50 g of magnesium powder, and dropwise a mixed solution of tetrahydrofuran (THF) and 119.2 g of bromocyclopentane slowly after initiation. When the dropwise addition was completed, the system was refluxed for 2-4 h to obtain 1.6 mol/L cyclopentyl Grignard reagent. Into a mixed solution of THF and o-chlorobenzonitrile (50.0 g), 840 mg CuBr was added, and cyclopentyl Grignard reagent (1.6 mol/L, 280 mL) was added dropwise under ice bath condition. After the dropwise addition, the system was refluxed for 1 h, and then cooled to room temperature, in which 100 ml of water, and then 200 ml of 15% dilute sulfuric acid were added. The system was stirred overnight. THF was rotary dried. The resultant was extracted with ethyl acetate (EA), dried and purified by passing through a silica gel column to obtain 60 g of Compound A, 2-chlorophenyl cyclopentyl ketone, with a yield of 80%.

Step 2: According to the reported method (Bioorganic & Medicinal Chemistry 2013, 12, 5098), 20 g (96 mmol) of Compound A was dissolved in 400 ml of EA. After Compound A was dissolved, copper bromide (54 g, 242 mmol) was added therein, the system was heated to reflux for 3 h, and then cooled to room temperature. The solid insolubles were filtered with diatomite. The filter residue was washed with dichloromethane (DCM). The washed solution was combined with the filtrate and then concentrated to obtain yellow oily compound B, 2-chlorophenyl (1-bromocyclopentyl) ketone. After passing through a silica gel column, 22 g of pure compound B was obtained with a yield of 80%.

Step 3: Ammonia gas was bubbled into 200 ml of ammonia water until saturation. Compound B (10 g) was added therein, and the solution was stirred for 24 h. Compound C was precipitated out, filtered and dried to obtain a brown solid of Compound C (7 g) with a yield of 70%, which was used directly in the next step.

Step 4: Compound C (5 g) was dissolved in dry THF, HCl gas was introduced therein until the pH value of the solution reached 1, and then the solution was rotary dried to obtain solid hydrochloride. To a single-neck flask, added was the solid hydrochloride salt. The system was placed in an oil bath at 190° C. under nitrogen protection for about 20 min, and then cooled to room temperature, neutralized with saturated sodium bicarbonate solution, extracted with DCM, concentrated and crystallized to obtain 2.9 g of compound D, a racemate of norketamine HNK, with a yield of 75%. $^1$H NMR (400 MHz, CDCl$_3$): δ7.67 (dd, J=7.8, 1.5 Hz, 1H), 7.37-7.32 (m, 2H), 7.25 (m, 1H), 2.78-2.71 (m, 1H), 2.61 (m, 1H), 2.51-2.43 (m, 1H), 2.08-2.0 (m, 1H), 1.88-1.63 (m, 4H).

Step 5: Compound D (1.11 g, 5 mmol) was dissolved in 2 ml methanol, L-tartaric acid (2.5 mmol) was added therein, and the solution was stirred for 1 h. The solution was dripped into 10 mL of acetone, and stood for crystallization. Then, the system was filtered to obtain L-tartrate crystals. The obtained L-tartrate crystals were recrystallized for 3 times. The obtained crystals were added into sodium bicarbonate solution to be neutralized, and then extracted with EA to obtain 165 mg of optically pure compound, E(R)-norketamine. The optical purity detected by chiral HPLC was 98.3% ee %, and the yield was 15%.

The chiral HPLC detection was performed with the following steps. In 1 ml of ethanol, 1 mg of compound E and 1 mg of control racemic compound D were dissolved, respectively, and were analyzed with Agilent 1260-A high performance liquid chromatography for normal phase uniformity. Chromatography column: Chiralcel-AD-H (4.6 mm×250 mm), mobile phase A: (n-hexane+0.1% diethylamine), mobile phase B: (ethanol+0.1% diethylamine), A:B=40:60, and flow rate: 1 mL/min. For Compound E, the retention time of the isomer of R configuration is 6.8 min, and the corresponding retention time of the isomer of S configuration is 5.3 min.

Step 6: Compound E (2.23 g, 10 mmol) was added to 60 ml of THF, and triethylamine (2.7 mL, 20 mmol) and $Boc_2O$ (3.3 g, 15 mmol) were added. The system was refluxed for 6 h, then cooled, and rotary dried. The resultant was passed through a silica gel column to obtain 2.92 g of Compound F with a yeild of 90%. 1H NMR (400 MHz, $CDCl_3$): δ7.81 (d,J=8.1 Hz, 1H), 7.40-7.28 (m, 2H), 7.24-7.12 (m, 1H), 6.57 (s, 1H), 3.82 (d,J=14.4 Hz, 1H), 2.45-2.36 (m, 1H), 2.28 (m, 1H), 2.04 (m, 1H), 1.89-1.56 (m, 4H), 1.27 (s, 9H). $^{13}C$ NMR (100 MHz, $CDCl_3$): δ207.9, 152.3, 134.5, 132.6, 130.3, 130.0, 128.3, 125.2, 78.0, 66.1, 38.5, 37.4, 29.7, 27.2, 20.9.

Step 7: Compound F (2.91 g, 9 mmol) was added to 60 mL of dry THF. The solution was cooled to −78° C. under argon protection, and 5 mL of HMPA was added, and then 2 M of LDA in THF solution (12 mL, 24 mmol) was slowly added dropwise. The system was stirred for 30-40 min, then slowly heated to −30° C. and stirred for 1 h. Then the system was cooled to −78° C. again and trimethylchlorosilane (TMSCl, 2.6 g, 24 mmol) was added. The system was slowly heated to −50° C., stirred for 3 h, saturated ammonium chloride solution was poured in and then the temperature of the system was elevated to room temperature. The system was concentrated by removing the solvent THF, and EA was added for extraction. The organic phase was dried over anhydrous $Na_2SO_4$. The solvent was rotary dried and the resultant was vacuum-dried to obtain an oily substance. The obtained oily substance was dissolved by adding 100 mL of anhydrous DCM. The solution was cooled to −15° C., and mCPBA (2.5 g, 11 mmol) was added under protection of argon gas. The obtained solution was stirred for 1 h, and then 50 mL of DCM was added and further stirred for 1 h. Then saturated solution of sodium thiosulfate and sodium bicarbonate (1:1) was poured in, and the system was extracted with DCM. The solvent was rotary dried and the resultant was vacuum dried to obtain an oily substance. The obtained oily substance was dissolved in 100 mL THF, and then cooled to −5° C., and tetrabutyl ammonium fluoride (3 g, 11.4 mmol) was added in the solution. The system was stirred for 30 min, and saturated solution of $NaHCO_3$ was added therein. The system was extracted with EA, the solvent was rotary dried and the resultant was vacuum-dried. The obtained substance was then passed through a silica gel column to obtain 1.92 g of compound G with a yield of 65%.

$^1H$ NMR (400 MHz, $CDCl_3$):δ7.81 (d,J=7.8 Hz, 1H), 7.34 (m, 2H), 7.24 (m, 1H), 6.60 (s, 1H), 4.12 (dd,J=11.7, 6.8 Hz, 1H), 3.87 (d,J=14.4 Hz, 1H), 3.38 (m, 1H), 2.36 (m, 1H), 1.74 (m, 2H), 1.68-1.57 (m, 1H), 1.55-1.40 (m, 1H), 1.30 (s, 9H). $^{13}C$ NMR (100 MHz, $CDCl_3$): 209.8, 153.2, 134.1, 133.6, 131.3, 130.8, 129.5, 126.2, 79.3, 72.2, 66.5, 40.3, 38.7, 28.1, 19.4.

Step 8: Compound G (680 mg) was dissolved in 5 ml of dry THF. Gaseous HCl was introduced into the solution at room temperature until saturated. The system was stirred for 4 h, 20 mL dry ether was added, and crystals were precipitated followed by filtration, and 520 mg hydrochloride salt of compound H, (2R,6R)-6-hydroxydemethylketamine (HNK) was obtained with a yield of 95%. $^1H$ NMR (400 MHz, $CD_3OD$): δ 7.85 (m, 1H), 7.65-7.51 (m, 3H), 4.28 (m, 1H), 3.19 (m, 1H), 2.30 (m, 1H), 1.81-1.72 (m, 2H), 1.64-1.51 (m, 2H).

Example 2: Synthesis of Compound I6

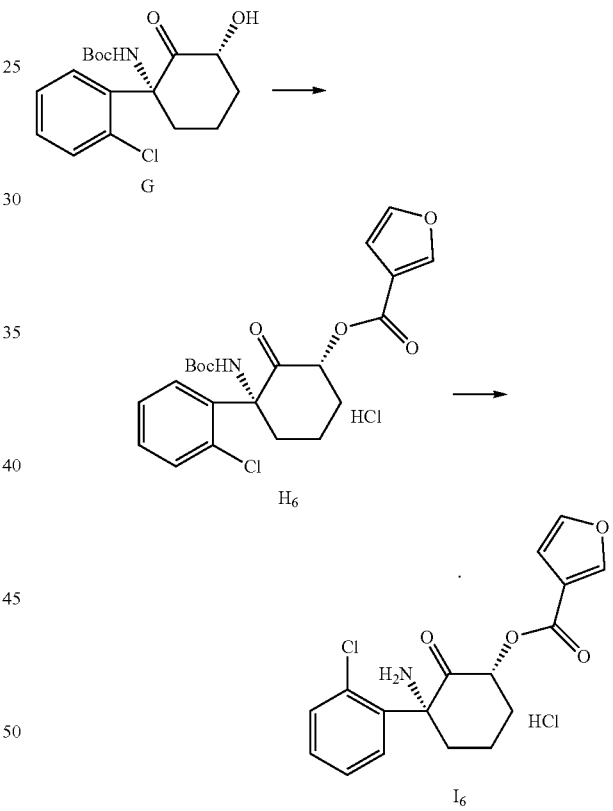

Compound G (170 mg, 0.5 mmol) was dissolved in 3 mL of dry THF, followed by addition of dry triethylamine (0.28 mL, 2 mmol). Then 3-furoyl chloride (130 mg, 1 mmol) was added under ice bath condition, then the temperature of the system was slowly raised to room temperature over 1 hour, and the system was stirred overnight. Sodium bicarbonate solution was added in the system, and the system was extracted with EA. The solvent was rotary dried and the resultant was dried in vacuum. The obtained substance was passed through a silica gel column to obtain 173 mg of Compound $H_6$, N—Boc-(2R,6R)-6-(3-furan)formyloxynorketamine, with a yield of 80%. $^1H$ NMR (400 MHz, $CDCl_3$): 8.11 (brs, 1H), 7.81-7.79 (brs, 1H), 7.42-7.28 (m, 4H), 6.67(brs, 1H), 6.63 (m, 1H), 5.35-5.31(m, 1H), 3.92-3.87(m, 1H), 2.39-2.33 (m,1H), 1.94-1.74 (m,4H), 1.30 (brs, 9H). $^{13}$C NMR (100 MHz, CDCl$_3$): 202.5, 168.5, 161.4, 153.3, 148.4, 143.8, 134.3, 133.7, 131.4, 131.1, 129.8, 126.3, 118.5, 109.1, 79.4, 73.5, 67.2, 38.5, 35.8, 28.2, 19.8.

Compound H$_6$ (170 mg) was dissolved in 3 mL of dry THF, gaseous HCl was introduced into the solution at room temperature until saturated and the system was stirred for 4 h. 15-20 mL of dry ether was added, crystals were precipitated, and the system was vacuum filtered to obtain 124 mg of Compound I$_6$, (2R,6R)-6-(3-furan)formyloxynorketamine hydrochloride salt, with a yield of 86%. $^1$H NMR (400 MHz, CD$_3$OD): 9.02 (brs, 3H), 8.09 (s, 1H), 7.79 (s, 1H), 7.43-7.40(m, 4H), 6.75(br, 1H), 5.39(m, 1H), 3.76-3.54 (m, 1H), 2.41-2.32(m, 2H), 2.10-1.93 (m, 3H). $^{13}$C NMR (100 MHz, CD$_3$OD): δ200.2, 168.5, 161.3, 148.8, 144.0, 136.9, 134.8, 132.1, 131.5, 129.3, 128.4, 118.5, 110.0, 73.6, 68.2, 37.3, 35.1, 19.5.

Example 3: Synthesis of Compounds C and D

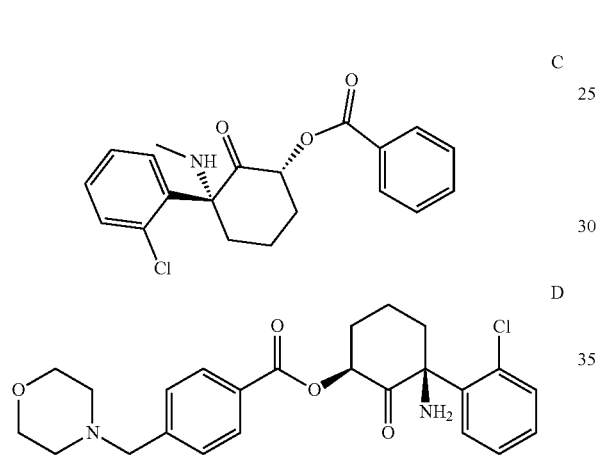

Compounds C and D were prepared and obtained by the following preparation method.

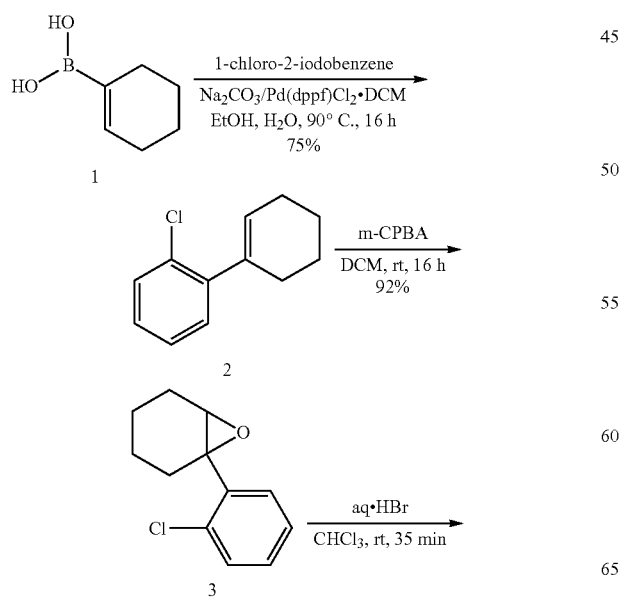

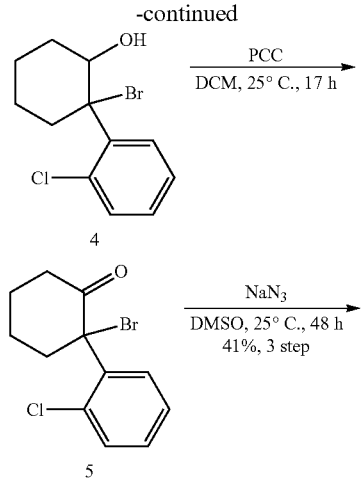

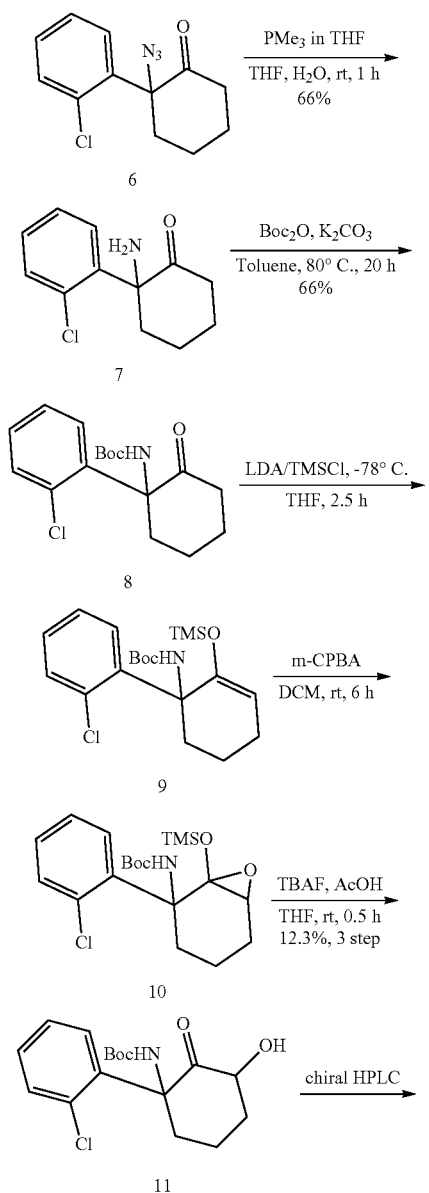

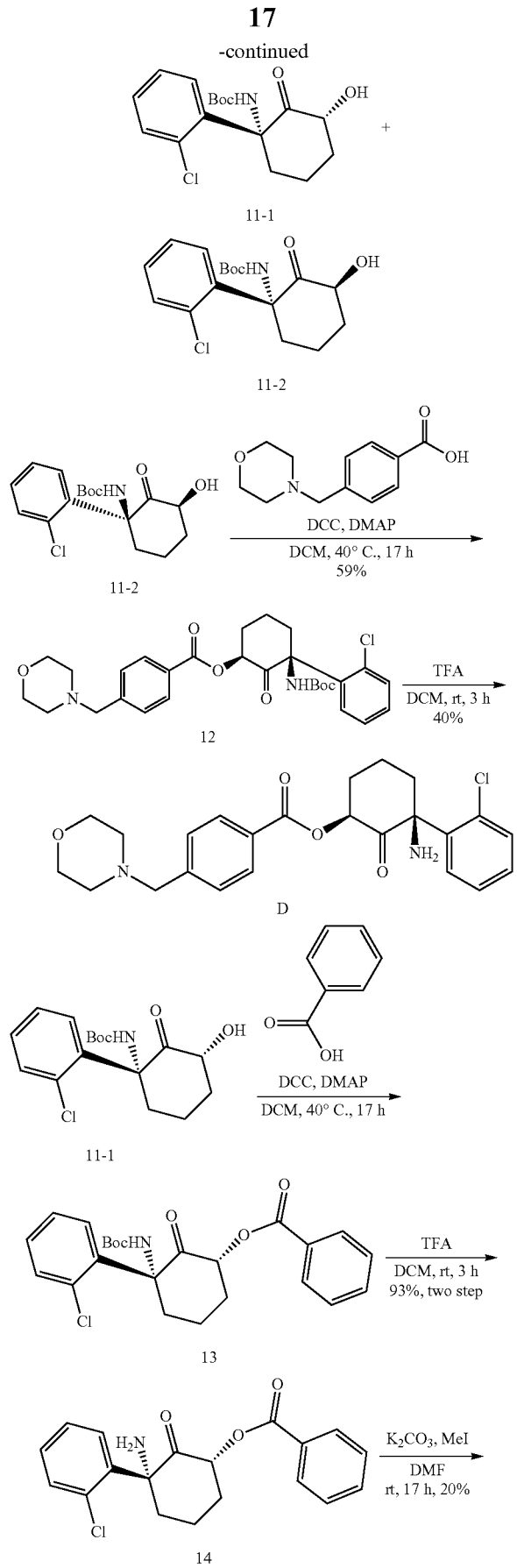
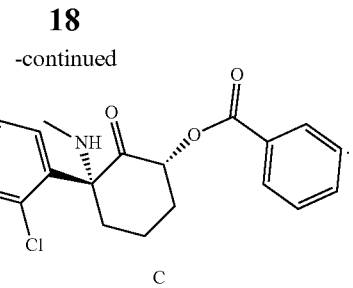

Example 4: Activity Tests

1. Forced Swimming Test

One hour before the forced swimming test (FST), the mice were transferred to the laboratory. The test was conducted under normal light condition and monitored by a digital camera. During the test, the mice were individually placed in transparent glass cylinders (28.5 cm in height, 14 cm in diameter) filled with 20 cm height of water (23±1° C.). On the first day, the mice were trained for 6 minutes and then removed from the cylinder. On the second day, the mice were administered saline, HNK, Compound 16, Compound C, and Compound D, and after different time periods, their immobility time was tested. During the last 4 minutes of the entire 6-minute swimming test, the static time was recorded through EthoVision XT (Noldus, Netherlands) of Noldus system. The static time was defined as passive floating, that is there was no other movement except the movements necessary to keep the animal's head above the water. After every two to three tests, the water in the cylinders was replaced. After the swimming test, the mice were removed from the water and dried under an infrared lamp.

The mice were given 1 mg (A), 10 mg (B) and 30 mg (C) of HNK and Compund I6 by intragastric administration, respectively, and their immobility time was measured after 1 hour and 7 days. The percentage of immobility time is expressed as mean±SEM. *$p<0.05$, **$p<0.01$, compared to base test. Mice of each group was N=8. Saline: saline group; I6: Compound I6 treatment group; HNK: 2R,6R-hydroxynorketamine treatment group.

2. Addiction Research

Materials and Methods

Animals: Male C57BL/6J mice of 8-12 weeks old were randomly divided into groups, 10 mice in each group, with body weight of 18-22 g, fed at room temperature (22±1° C.), under humidity of (50±10)%, illumination time from 8:00 to20:00. The mice had free access to food and water, and adapted to the experimental environment for at least 2-3 days before the experiments. All experiments were conducted from 8:00 to 16:00.

Behavioral Sensitization Experiment:

1.1 Small animal spontaneous activity measurement: An animal spontaneous activity infrared analysis system consists of a spontaneous activity box, an infrared probe device and a data acquisition system. The size of the spontaneous activity box is 40 cm×40 cm×65 cm, with sound isolation and light isolation, and mounted with a ventilation device. The activity statuses of the animals were recorded by the infrared probe, and the numbers of spontaneous activities of the animals were calculated. In order to test the effect of drugs on spontaneous activities of mice, the mice were randomly divided into 4 groups with 10 mice in each group. The Groups included: vehicle, I6, C, D (5.0, 10.0, 30.0 mg/kg), mor (10 mg/kg). The mice were administrated intragastrically once a day in the morning for 7 consecutive days; after that, the drugs withdrew for 7 days (without any treatment). On the 15$^{th}$ day, mice in each group were given Veh and the drugs (5.0, 10.0, 30.0 mg/kg) by intragastric administration to stimulate. Spontaneous activity of the mice within 1 hour was measured immediately after administration at d1, d7 and d15.

1.2 CPP experiment: A three-room CPP system includes black and white boxes (25 cm×25 cm×30 cm) at left and right sides, separated by a middle box (10 cm×25 cm×30 cm). During the experiment, mice were put into the middle box and could freely move to the black and white boxes. A door with the size of 5 cm×5 cm was arranged between the middle box and each of the black and white boxes. The experiment adopted a biased procedure, which had three stages of pre-test, training, and test stages. During the whole experiment, the environmental conditions such as light, color and smell in the boxes were guaranteed to be consistent.

Pre-test stage: On days 1-3, the spacer plates between the boxes were removed, and all mice were put into the middle box after being injected with saline subcutaneously, allowing them to move freely in the boxes for 15 min, once a day for 3 consecutive days. The residence time of the mice in the black and white boxes was respectively recorded to determine the natural preference of the mice. The mice were trained with the non-natural preference box as the companion medicine box.

Training stage: On days 4-9, the doors were closed, the mice were randomly divided into groups of Veh, mor, I6, C, D (5.0, 10.0, 30.0 mg/kg), and mor (10 mg/kg), 10 mice in each group. In the morning of each odd number of days, all mice were given saline by intragastric administration and immediately put into non-companion medicine box (black box) for 45 min. In the afternoon of each odd number of days, groups of Veh, mor, I6, C and D (5.0, 10.0, 30.0 mg/kg) were administered with the drugs by intragastric administration, and then immediately put into the companion medicine box (white box) for 45 min. In each even number of days, the training order was reversed. The interval between morning and afternoon trainings was more than 6 hours, and the training time was fixed every day, with 10 mice in each group for 6 days.

Test stage: on day 10, the spacer plates were removed, and the mice were put into the middle box allowing to move freely. At the same time, the residence time of the mice in the white box within 15 min were recorded.

Statistical analysis: Experimental data were expressed as X±SEM. Graphpad software was used for statistical analysis, and t-test was used for comparison between two groups. One-way ANOVA analysis was used for comparison among multiple groups, and then LSD method was used for pairwise comparison.

3. Position Preference Experiment

Position preference was tested by a three-room system. Mice were trained with the non-natural preference box as the companion medicine box. During the training stage, the mice were given saline (Veh), morphine (mor, 10 mg/kg), Compounds I6, C and D (5.0, 10.0, 30.0 mg/kg), respectively. After continuous training for 6 days, the test was carried out, and the residence times of the mice within 15 min in the white box were recorded. Compared with Veh group, *p<0.05 (n=10).

Example 5: Experimental Results

1. Depression-Like Behavior Test Results of the Mice:

1 mg of HNK or I6 had no antidepressant effect. Both 10 mg of HNK and I6 had antidepressant effect, in which I6 has a long-acting effect, where the efficacy thereof substantially did not decrease within 7 days, while the efficacy of HNK decreased rapidly within 7 days, and substantially had no effect on the 7$^{th}$ day. Both 30 mg HNK and I6 had antidepressant effect, in which I6 had a long-acting effect, and the efficacy thereof substantially did not decrease within 7 days, while the efficacy of HNK decayed rapidly within 7 days, and substantially had no effect on the 7$^{th}$ day.

Compounds C and D had no antidepressant effect with the dose of 30 mg.

Compared with the HNK-treated group, the I6-treated group had a significant antidepressant effect even at the 7$^{th}$ day after administration, as manifested by a reduction in the animals' immobility time during forced swimming. The I6 group had less immobility time. There was no significant difference between the 10 mg and 30 mg treatment groups, although the 30 mg treated group showed a stronger decreasing trend. Compounds C and D had no antidepressant effect.

2. Addiction Experiment

Different doses (5 mg, 10 mg, 30 mg) of I6 had no behavioral sensitization effect on mice.

Different doses (5 mg, 10 mg, 30 mg) of C and D had behavioral sensitizing effect on mice.

3. Position Preference Experiment

Different doses (5 mg, 10 mg, 30 mg) of I6 had no position preference effect on mice.

Different doses (5 mg, 10 mg, 30 mg) of C and D induced position preference on mice.

The technical features of the above-mentioned embodiments can be combined arbitrarily. For the sake of brevity, all possible combinations of the technical features in the above-described embodiments are not described. However, as long as there is no contradiction between the combinations of these technical features, they should be regarded as within the scope described in this specification.

The above-mentioned embodiments only represent several embodiments of the disclosure, and the descriptions thereof are relatively specific and detailed, but should not be construed as a limitation on the scope of the patent application. It should be noted that a number of modifications and improvements may be made by those skilled in the art, without departing from the concept of the disclosure, which all belong to the protection scope of the application. Therefore, the protection scope of the patent application shall be subject to the appended claims.

The invention claimed is:

1. A compound represented by Formula III, or a salt, stereoisomer or tautomer thereof:

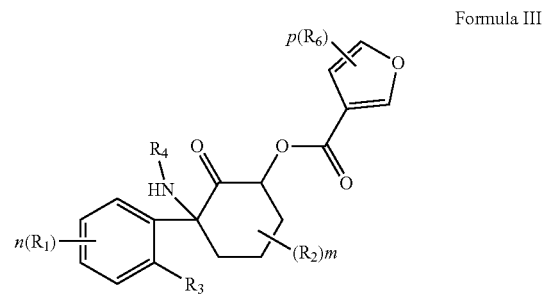

Formula III wherein,
- m is an integer from 0 to 3, n is an integer from 0 to 4, and p is an integer from 0 to 3;
- $R_1$ and $R_2$ are each independently one or more selected from a group consisting of H, halogen, hydroxyl, amino, cyano, substituted or unsubstituted $C_1$-$C_6$ alkyl group, substituted or unsubstituted $C_2$-$C_6$ alkenyl group, substituted or unsubstituted $C_2$-$C_6$ alkynyl group, substituted or unsubstituted $C_3$-$C_{10}$ cycloalkyl group, substituted or unsubstituted $C_2$-$C_{10}$ heterocyclic group, substituted or unsubstituted $C_1$-$C_6$ alkoxy group, substituted or unsubstituted mono- and di-$C_1$-$C_6$ alkylamino group, substituted or unsubstituted aryl group, and substituted or unsubstituted heteroaryl group;
- $R_3$ is halogen;
- $R_4$ is selected from a group consisting of H, substituted or unsubstituted $C_1$-$C_6$ alkyl group, substituted or unsubstituted $C_1$-$C_8$ acyl group, substituted or unsubstituted arylacyl group, and substituted or unsubstituted heteroarylacyl group;
- $R_6$ is selected from a group consisting of H, substituted or unsubstituted $C_1$-$C_6$ alkyl group, substituted or unsubstituted $C_2$-$C_6$ alkenyl group, substituted or unsubstituted $C_2$-$C_6$ alkynyl group, substituted or unsubstituted $C_3$-$C_{10}$ cycloalkyl group, substituted or unsubstituted $C_2$-$C_{10}$ heterocyclic group, substituted or unsubstituted aryl group, substituted or unsubstituted heteroaryl group, substituted or unsubstituted $C_1$-$C_8$ acyl group, substituted or unsubstituted arylacyl group, and substituted or unsubstituted heteroaryl acyl,
- wherein a group is substituted means that the group is substituted by a substituent selected from OH; $NH_2$; $C_1$-$C_{10}$ alkyl, alkenyl or alkynyl group; $C_1$-$C_{10}$ alkylamine group; sulfhydryl group; $C_1$-$C_{10}$ alkylsulfhydryl group; $C_1$-$C_{20}$ alkoxy group; $C_1$-$C_{10}$ carbonyl group; $C_3$-$C_{10}$ cycloalkyl group; 3 to 10-membered heterocyclic group with one or more heteroatoms selected from N, S, O and P; $C_6$-$C_{20}$ aryl group; $C_2$-$C_{20}$ heteroaryl group; nitrocyano; and halogen.

2. The compound according to claim 1, represented by Formula IV:

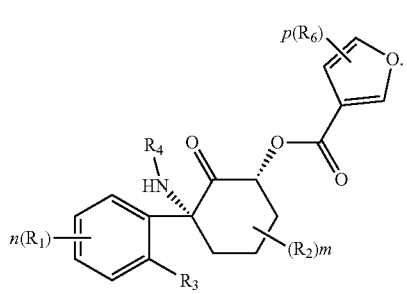

Formula IV

3. The compound according to claim 1, wherein the compound is shown below:

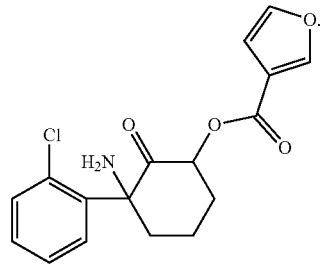 [SMILES: NC1(c2ccccc2Cl)CCCC(OC(=O)c2ccoc2)C1=O]

4. The compound according to claim 1, wherein the compound is shown below:

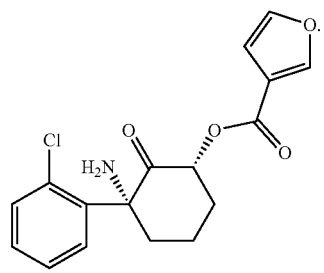 [SMILES: N[C@@]1(c2ccccc2Cl)CCC[C@@H](OC(=O)c2ccoc2)C1=O]

5. A compound, or a salt, stereoisomer or tautomer thereof, wherein the compound is shown below:

Formula V

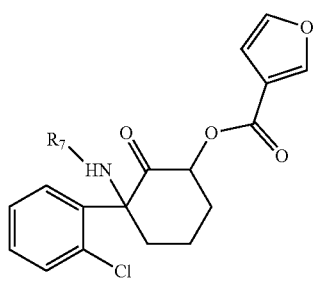

wherein Ry is H or a protecting group.

6. The compound according to claim 5, wherein the compound is shown below:

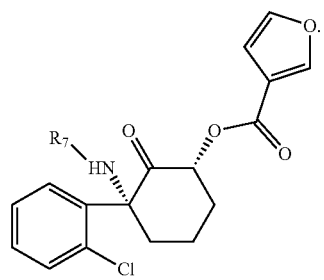

7. The compound according to claim 5, wherein the compound is shown below:

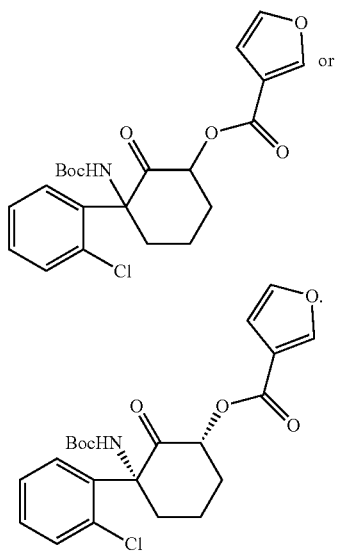

8. A pharmaceutical composition, comprising the compound, or the salt, stereoisomer or tautomer thereof according to claim 1, and optionally a pharmaceutically acceptable carrier.

9. A pharmaceutical composition, comprising the compound, or the salt, stereoisomer or tautomer thereof according to claim 5, and optionally a pharmaceutically acceptable carrier.

10. A preparation method of a compound ($I_6$), wherein the preparation method comprises steps of:

esterifying a compound (G) to produce product ($H_6$); and deprotecting the product ($H_6$) to produce the compound ($I_6$),

11. A method for anesthesia, alleviating pain, improving cognitive function, lung protection, anti-depression, mitigating anxiety and post-traumatic stress syndrome, or preventing or treating amyotrophic lateral sclerosis or complex regional pain syndrome of a subject, comprising administrating a therapeutic effective amount of the compound, or the salt, stereoisomer or tautomer thereof according to claim 1 to the subject.

12. The method of claim 11, wherein the pain comprises chronic pain or neuropathic pain; depression comprises bipolar depression or major depressive disorder; and improving the cognitive function comprises preventing or treating Alzheimer's dementia or Parkinson's disease.

13. A method for anesthesia, alleviating pain, improving cognitive function, lung protection, anti-depression, mitigating anxiety and post-traumatic stress syndrome, or preventing or treating amyotrophic lateral sclerosis or complex regional pain syndrome of a subject, comprising administrating a therapeutic effective amount of the compound, or the salt, stereoisomer or tautomer thereof according to claim 5 to the subject.

14. The method of claim 13, wherein the pain comprises chronic pain or neuropathic pain; depression comprises bipolar depression or major depressive disorder; and improving the cognitive function comprises preventing or treating Alzheimer's dementia or Parkinson's disease.

* * * * *